United States Patent [19]

Krohn et al.

[11] Patent Number: 4,899,368
[45] Date of Patent: Feb. 6, 1990

[54] SWITCHING MECHANISM FOR ELECTRICAL DEVICES

[76] Inventors: Lisa Krohn, 45 Gramercy Park N., New York, N.Y. 10010; Tucker Viemeister, 74 Fifth Ave., New York, N.Y. 10011

[21] Appl. No.: 147,312
[22] Filed: Jan. 22, 1988
[51] Int. Cl.⁴ .................. H01H 3/16; H04M 1/21; H04M 1/64
[52] U.S. Cl. .................... 379/67; 200/61.7; 379/70; 379/110; 379/355; 379/396; 379/422
[58] Field of Search ............... 379/67, 422, 355, 354, 379/110, 70, 76, 68, 357, 356, 396; 200/61.7

[56] References Cited

U.S. PATENT DOCUMENTS 4,164,630  8/1979  Brodbeck ..................... 379/354
4,275,273  7/1981  Ts'Ao ......................... 379/355
4,278,845  7/1981  Chiou ......................... 379/355

FOREIGN PATENT DOCUMENTS

7700973  8/1978  Netherlands ............... 379/70
1065165  4/1967  United Kingdom ........ 379/70

Primary Examiner—Thomas W. Brown
Attorney, Agent, or Firm—Dimitrios T. Drivas

[57] ABSTRACT

The present invention concerns a switching mechanism for electrical devices where the operations of each device are controlled by turning the page-like switches of the mechanism in a manner similar to turning the pages of a book. A preferred embodiment of the invention concerns an integral telephone and telephone answering machine.

8 Claims, 7 Drawing Sheets

SWITCHING MECHANISM FOR ELECTRICAL DEVICES

BACKGROUND AND SUMMARY OF THE INVENTION

The present invention concerns a switching mechanism for electrical devices in which the individual actuating members of the mechanism have the appearance of a page. In this novel mechanism the switches controlling the electrical devices are turned ON or OFF in a manner which simulates the turning or flipping of a page of a book. According to the invention these page-switches are provided with written information, instructions or directions on their face which concern the electrical devices which each individual page-switch controls. The present invention thus provides a novel user-friendly switching mechanism useful for various electrical devices.

A preferred embodiment of the invention concerns an integral telephone and answering machine. In this embodiment of the invention the turning of the pages or switches selects the operations that are controlled by the function switches of the device. The operations of the telephone or answering machine can therefore be divided, organized and presented in functional groups. This limits the quantity of switches necessary and provides for the clear and easy operation of the device.

The invention by providing for the use of page-switches to change the operational mode or functions of complex technological devices makes the operation of such devices conceptually easy for the average lay user to understand. In addition the surface or faces of the pages or page-switches can be provided with specific instructions and procedures for easy reference and easier operation of the device. Thus the present invention can be applied to any complex multifunctional electronic or electromechanical device to make its operation easier for the user who is not skilled in its operation or the technology it embodies. The present invention can thus be used to make the operation of devices such as photocopying machines, audio-visual equipment, vending machines, kitchen appliances, medical equipment, video equipment, to name but a few, more user friendly and easier to operate.

The switching mechanism of the invention comprises a plurality of actuating members having the appearance of a page. These page-like members are constructed, configured and dimensioned to actuate a switch means upon the turning or flipping of each member in a manner which simulates the turning of a page of a book. Each switch member is electrically connected to a device and controls certain functions of the device. Each function is actuated by a functional switching means, which is in turn connected to the switching mechanism. One of the advantages of the invention is that the page-switches or actuating members of the invention may contain readable indicia on their front or back face concerning the functions of the electronic device.

In the preferred embodiment, the invention concerns a switching mechanism for an integral telephone and telephone answering machine comprising a plurality of page-switch actuating members constructed, configured and dimensioned to be in the form of a book and to actuate a switch means upon the turning of each member in a manner which simulates the turning of a page of a book. For example in this embodiment at least one switch means is connected to a telephone, and in addition at least one switch means is connected to a telephone answering machine. The first switch means is connected to a functional switch means which controls the functions of the telephone and the second switch means is connected to a functional switch means which controls the functions of the telephone answering machine. Additional switch means can be added as necessary. The faces of the actuating members which actuate the first switch means contain readable indicia concerning the functions of the telephone and the faces of the actuating member which actuates the second switch means contain readable indicia concerning the functions of the telephone answering machine. Other written information such as telephone numbers, etc. can also be provided on the faces of the members. Additional switch means for other devices or functions e.g. facsimile transmission or LCD readout, can be added as necessary.

DETAILED DESCRIPTION OF THE PREFERRED EMBODIMENT

FIGS. 1 through 6 illustrate a preferred embodiment of the invention in the form of an integral telephone and telephone answering machine. In this embodiment various operations, e.g. telephone, telephone recording device, speaker phone, playback, auto-dial etc. are activated by the page-switch mechanism of the invention. The machine comprises a book base 42 connected to a central hinge means 45 made up of a plurality of hinges 23 each connected to actuating members in the form of page-switches 22. The page-switches or actuating members 22 comprise a front face 20, and a back face 21. These faces or surfaces may contain readable indicia such as numbers, letters or symbols. The readable indicia may be in the form of instructions, directions or text concerning the various functions of each device activated by each page-switch 22 and controlled by the function keys 43. This is particularly useful since the functions of the functional switches 43, change with each page-switch 22. Alternatively, the readable indicia may comprise telephone number lists, operating instructions and procedures, or other information useful to the operator of the device. In other embodiments of the invention the readable indicia may be in braille characters so as to provide a user-friendly device for the visually impaired operator. In still other embodiments of the invention each individual page-switch may be connected to an audio-chip which when activated may provide information concerning the functions activated by the page-switch over the device's audio system.

On the left side of the book base 42 is situated a telephone key pad comprising a plurality of buttons 50. The dialing buttons 50 are constructed and configured so as to protrude through holes in the actuating members 22. The holes 49 are positioned to correspond to the dialing buttons 50 so that the telephone can be dialed by pushing the dialing buttons no matter which actuating member is positioned in the ON or OFF position. Each of the actuating members 22 has a tab 46 co-extensive therewith for ease of turning the page-switch or actuating member.

The right side of the book base 42 comprises an audio player and recorder 55 as part of the telephone answering machine. Any electronic means for sending an outgoing message and recording an incoming message may be used. A light 44 is also contained on the right side of the book base 42 and indicates whether a message has been recorded on the answering machine. Continuous with the control hinge means 45 a microphone 40 may be provided which is electrically connected to the answering machine and is used for the purpose of recording messages or for use as a speaker phone. Also connected to the central hinge means 45 is a volume control 41 which is also electrically connected to the integral telephone answering machine.

On the right side of the book body are functional switch buttons 43. These functional switch buttons are connected to the functional switching means which are in turn electrically connected to the switching means which is activated by the actuating members 22. On the left side of the book body and co-extensive therewith is a cradle 54 for the telephone handset 48. The handset cradle 54 contains a button 47 which activates a telephone line when the handset is removed. The handset 48 contains an activating switch depression 52 which engages the activating switch 47 when the handset is replaced on the cradle 54. The activating switch depression 54, may also be designed so that it is integral with the receiver for voice communications. The handset also contains a telephone speaker 53. The book base 42 may be co-extensive and attached to the machine base 60. The machine base may have incorporated within it the automatic telephone answering means for sending an outgoing message and recording an incoming message. The machine base in certain embodiments may also incorporate facsimile means for transmission of graphic information. In other embodiments the book base and machine may be the same. The machine base 60 is continuous with the handset cradle 54 and also contains an attachment means for attaching a telephone jack and may optionally contain an outlet for a speaker. In other embodiments of the invention the base may contain alternative connecting or communication means. In another embodiment, the base is provided with communications means for a remote or cellular telephone device.

FIGS. 7A through 7F illustrates various internal actuating mechanisms that may be used in the switching mechanism of the invention. These actuating mechanisms serve to open and close electrical circuits which are connected to the switching mechanism. In each of these embodiments an actuating member having the appearance of a page 22, is co-extensive with a hinge means, 23. The actuating member has a front face, 20, and a back face, 21. In each of these embodiments the switching means is actuated by turning the actuating member in a manner similar to turning the page of a book. In this manner if one turns the actuating member 22 depicted in FIG. 7B in the direction of the arrow 29 to the position in FIG. 7A the switching mechanism will be turned from the OFF position to the ON position. For example, if one turns the actuating member from position in FIG. 7E in the direction of the arrow 34 to the position of FIG. 7F, the switching mechanism will be turned from the ON position to the OFF position.

Figure 1:
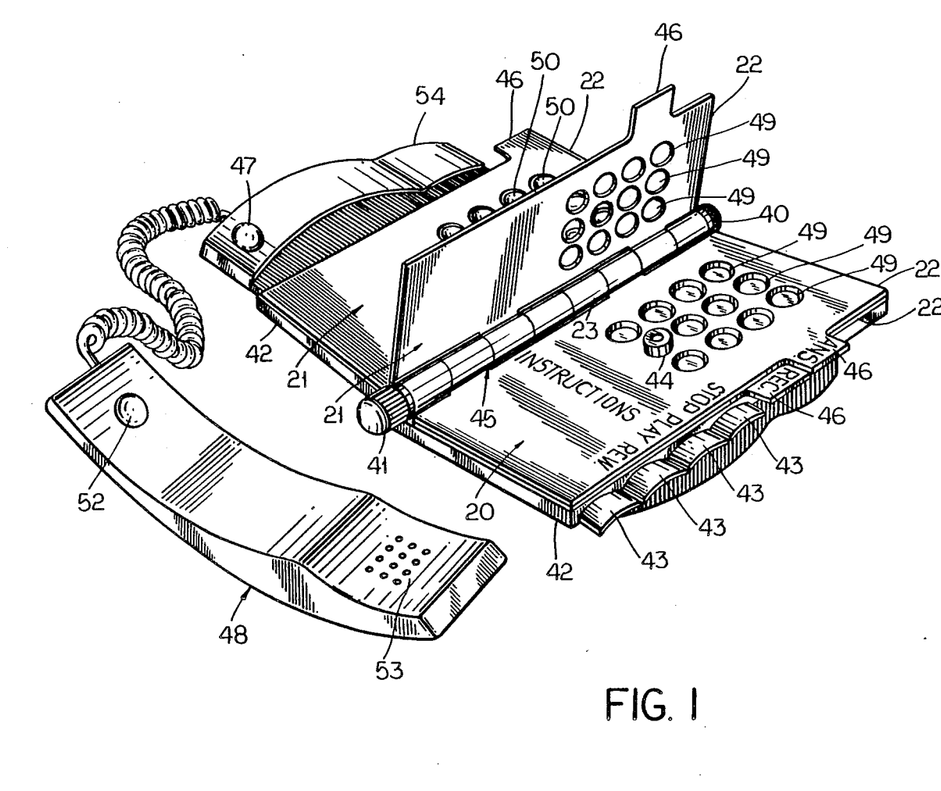
FIG. 1 is a perspective view of an integral telephone and telephone answering machine according to the invention.
Figure 2:
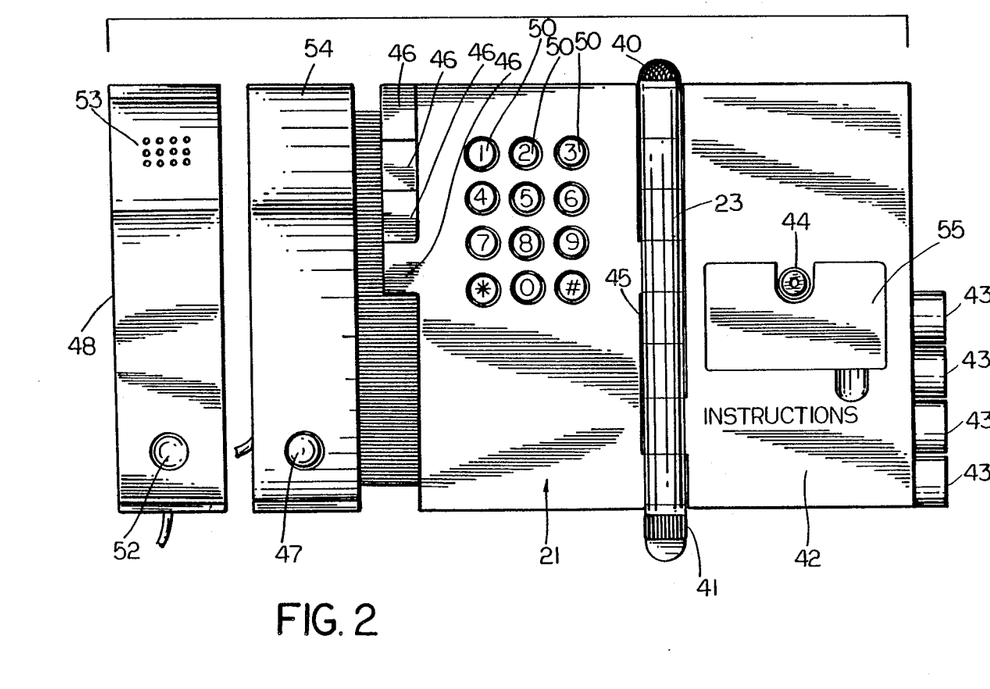
FIG. 2 is a top view of an integral telephone and telephone answering machine according to the invention.
Figure 3:
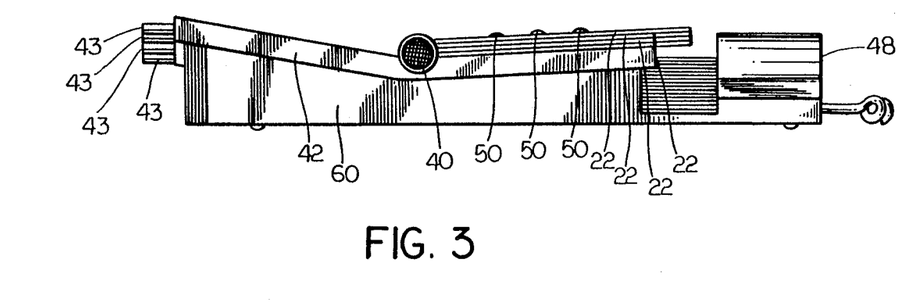
FIG. 3 is a back elevational view of an integral telephone and telephone answering machine according to the invention.
Figure 4:
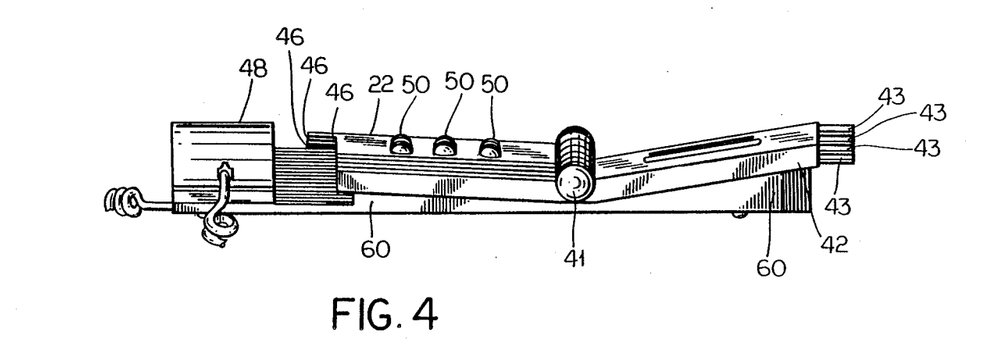
FIG. 4 is a front elevational view of an integral telephone and telephone answering machine according to the invention.
Figure 5:
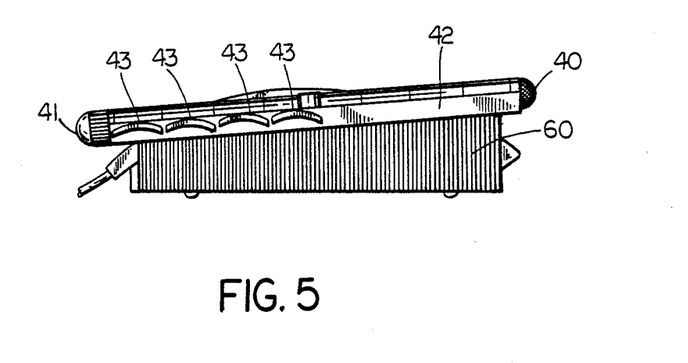
FIG. 5 is a right side elevational view of an integral telephone and telephone answering machine according to the invention.
Figure 6:
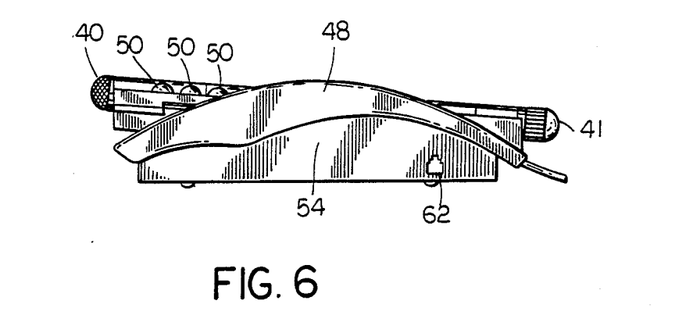
FIG. 6 is a left side elevational view of an integral telephone and telephone answering machine according to the invention.
Figure 7A:
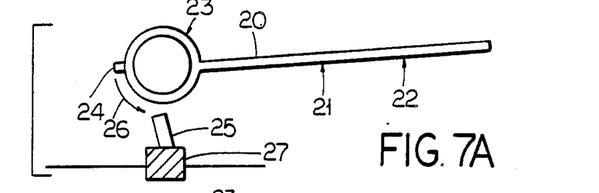
FIG. 7A depicts the ON position of a switching mechanism in an embodiment of the invention wherein the actuating member actuates a flip switch.
Figure 7B:
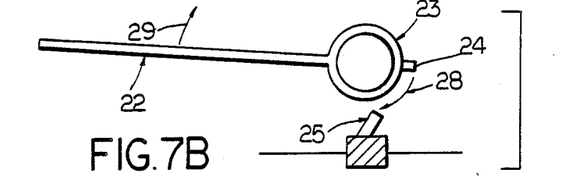
FIG. 7B depicts the OFF position of a switching mechanism in an embodiment of the invention wherein the actuating member actuates a flip switch.

FIG. 7A and FIG. 7B depict a preferred embodiment of the invention where the switching mechanism is activated by a flip switch. FIG. 7A indicates the ON position and, FIG. 7B the OFF position. The switch is activated by the nub, 24, co-extensive with the hinge, 23, which when moved in the direction of the arrow 26, moves the flip switch 25, which is connected to the switch mechanism body, 27, from the ON position to the OFF position and thus turns the switch off. To activate the switch from the OFF position in FIG. 7B the actuating member, 22, is moved in the direction 29, so that the hinge nub, 24, moves in the direction 28, and moves the flip switch 25 to the ON position.

Figure 7C:
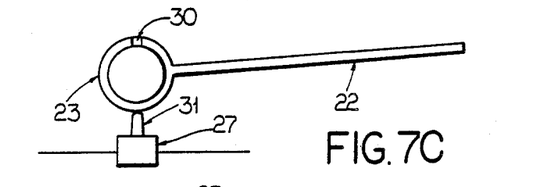
FIG. 7C depicts the ON position of a switching mechanism in an embodiment of the invention wherein the actuating member actuates a push button switch.
Figure 7D:
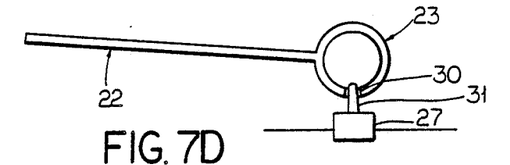
FIG. 7D depicts the OFF position of a switching mechanism in an embodiment of the invention where the actuating member actuates a push button switch.

FIG. 7C and FIG. 7D depict an embodiment of the switching mechanism invention wherein the switching mechanism is activated by a push-button switch 31. The push-button switch 31 is connected to the switching mechanism body 27. The switch is activated when the depression or hole 30 in the hinge 23 is Placed in position so that the push-button 31 emerges into the hole or depression 30, FIG. 7D, interrupting the circuit within the switch mechanism thus turning the switch off.

Figure 7E:
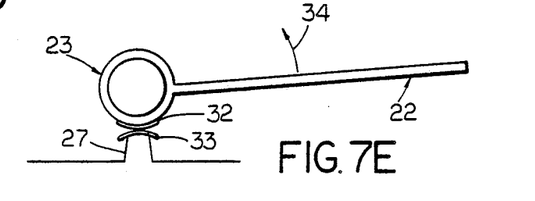
FIG. 7E depicts the ON position of a switching mechanism in an embodiment of the invention wherein the actuating member actuates a direct contact switch.
Figure 7F:
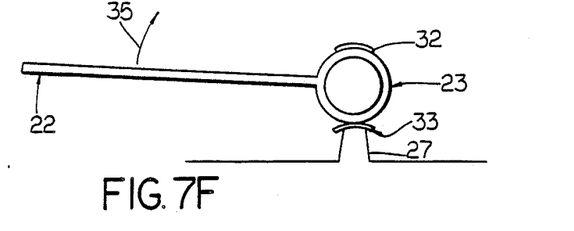
FIG. 7F depicts the OFF position of a switching mechanism in an embodiment of the invention where in the actuating member actuates a direct contact switch.

FIG. 7E and FIG. 7F depict an embodiment of the invention wherein the switching mechanism is actuated by direct contact. In this embodiment a strip of a conductor 32, e.g. a section of copper or another electrically conducting metal, is co-extensive with the hinge 23. This conductor 32 acts to create a circuit within the interrupted conductor means 33 that is co-extensive with the switch means body 27. When the conductor 32 and the interrupted conductor 33 are in the ON position as depicted in FIG. 7E the conductor 32 establishes a circuit through the interrupted conductor 33 and thus activates the switch. To inactivate the switch the actuating member is moved in the direction 34 in a manner similar to turning the page of a book and thus the contact between the conductor and interrupted conductor is ended, turning the switch off.

The embodiments depicted in FIGS. 7A through 7F are shown for means of illustration only. It is contemplated that other means, e.g. magnetic induction and others, known to those skilled in the art may also be used as actuating means for the page like members of the switching mechanism of the invention without departing from the spirit of the invention.

Figure 8:
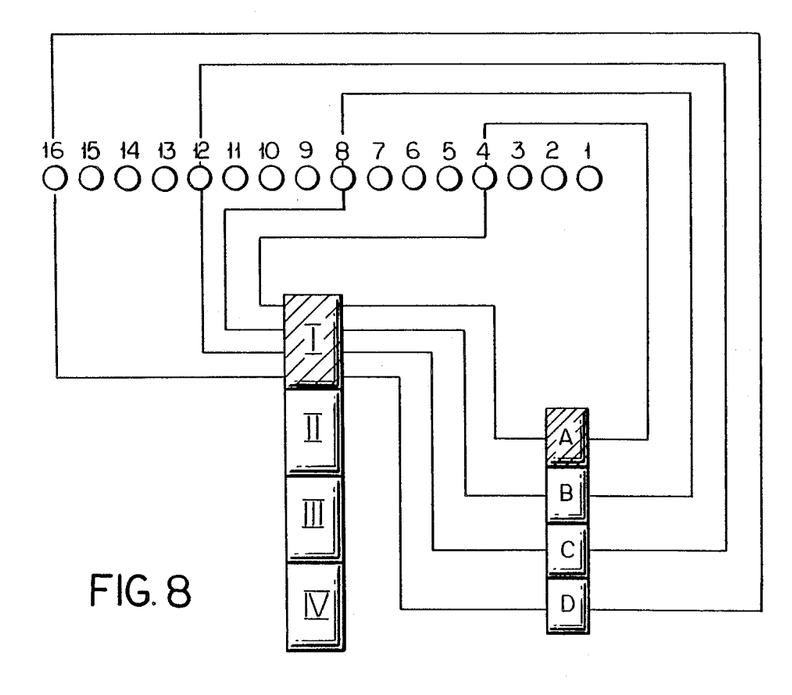
FIG. 8 is a schematic diagram of the circuitry of a switching mechanism according to the invention.

FIG. 8 represents a schematic diagram of the circuitry of a switching mechanism according to the invention. I, II, III and IV represent actuating members or page-switches corresponding to the actuating member, 22, of FIGS. 7A through 7F. Each of these actuating members can actuate a switch means with a mechanism as depicted in FIGS. 7A through 7F. Each of the actuating members in FIG. 8 I, II, III, and IV actuate a switching means connected to a specific device or operation e.g. a telephone, telephone recording machine, facsimile machine.

In FIG. 8 actuating member or master page-switch I, is directly connected to an electronic device e.g. a telephone answering machine. This telephone answering machine may have certain operations or functions such as, recording a message, automatic playing of the recording, playback of the message, transcription of the voice, or erasing the recording. The circles numbered 4, 8, 12 and 16 in FIG. 8 are representative of some of these functions. These functions are in turn controlled by the function switches, A, B, C and D. The function switches A, B, C and D are connected to and actuated by the master page-switch I. Each of the other master page-switches II, III and IV are in turn connected to a specific electronic device, e.g. an automatic dialer for a telephone, speaker phone, etc. The operations or functions of each device are in turn controlled by the functional switches A, B, C and D which are activated by each of the master page-switches. The set or group functions controlled by the function switches are determined by which of the master page-switches or actuating members is in the ON position or in other words by what page the user is "ON". For instance, when the user is on page I (master page-switch I) the group of functions 4, 8, 12 and 16 will be controlled by functional switches A, B, C and D. Thus, for example, another device e.g. a memory speed dialer having functions 1, 5, 9 and 13 will be controlled by a separate master page-switch or actuating member e.g. page-switch II.

In a preferred embodiment of the invention the front 20, and/or back face 21 of the actuating members 22, contain readable indicia concerning the functions of the device that are controlled by the function switches upon being activated by the actuating member containing the readable indicia. These readable indicia may be in the form of text, e.g. written instructions, schematics, numbers or some other form of readable information or recognizable information such as notes added by the user, that are useful to the user of the device. The readable indicia may for example instruct the user of the device as to the proper use or selection of the function switches and the functions of the electronic device activated by the actuating member. For example the actuating member I of FIG. 8 may contain readable indicia on one of its faces concerning the functions or operation of the functional switches A, B, C and D and the functions of the telephone answering machine that they in turn operate, thus making the machine easier for the user to operate.

Figure 9:
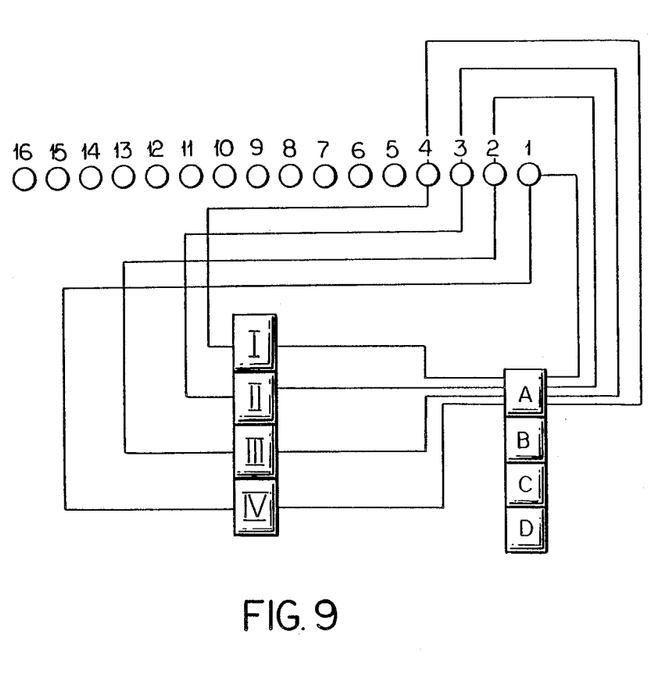
FIG. 9 is a schematic diagram of the circuitry of the functional switching mechanism according to the invention.

FIG. 9 is a schematic diagram of the circuitry of a function switching mechanism according to the invention which illustrates how the functions or operations for each function switch change by actuating a different master page-switch or actuating member. For example, function switch A in FIG. 9 may control four functions of a telephone e.g. speaker phone, hold, intercom, speed-dial, represented by the circled numbers 1, 2, 3 and 4. Function switch controls or activates function 1 when master page-switch I is in the ON position. Function switch A controls function 2 when master page-switch II is ON, function 3, when pages switch III is ON and function 4 when switch IV is ON. Each of the other function switches B, C and D is in turn controlled by the master page-switch or the actuating members I, II, III and IV so that each of the function switches controls four different functions for each of the devices that are activated by the master page-switches.

Having specifically described a preferred embodiment of the invention, it is apparent that the invention is not limited to such an embodiment and that many modifications and variations may be effected therein by one skilled in the art without departing from the spirit or scope of the present invention as defined in the appended claims.

We claim:

1. A switching mechanism for an electronic device having a plurality of operations comprising a plurality of actuating members each specific for the selection of an operation of the device, each operation having a plurality of functions and each connected to a switch means for selecting the operation of the device, each actuating member having the appearance of a page, and being constructed, configured and dimensioned to actuate the switch means from a non-operating to an operating condition upon the turning of each member in a manner which simulates the turning of a page of a book, each switch means being connected to and actuating a functional switch means which controls functions of operations of the device, each functional switch means being connected to and controlling a plurality of functional switch actuating means.

2. The switching mechanism of claim 1 wherein the electronic device comprises a telephone.

3. The switching mechanism of claim 1 wherein the electronic device comprises a telephone answering machine.

4. The switching mechanism of claim 1 wherein the electronic device comprises an integral telephone and telephone answering machine.

5. A switching mechanism for an integral telephone and telephone answering machine comprising a plurality of actuating members having the appearance of a page, each member including a front face and a back face, the members being constructed, configured and dimensioned to actuate a switch means upon the turning of each member in a manner which simulates the turning of a page of a book, a first switch means being connected to a telephone and a second switch means being connected to a telephone answering machine.

6. The switching mechanism of claim 5 wherein the first switch means is connected to a functional switch means which controls the functions of the telephone and the second switch means is connected to a functional switch means which controls the functions of the telephone answering machine.

7. The switching mechanism of claim 6 wherein the faces of the actuating member which actuates the first switch means contain readable indicia concerning the functions of the telephone and the faces of the actuating member which actuates the second switch means contain readable indicia concerning the functions of the telephone answering machine.

8. The switching mechanism of claim 1, wherein the actuating members contain readable indicia.

* * * * *